(12) United States Patent
Zeng et al.

(10) Patent No.: US 7,701,672 B2
(45) Date of Patent: Apr. 20, 2010

(54) SUSPENSION WITH LOCALLY STIFFENED LOAD BEAM

(75) Inventors: Qinghua Zeng, Fremont, CA (US); Chao-Hui Yang, Milpitas, CA (US); Yen Fu, San Jose, CA (US); Ellis Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 976 days.

(21) Appl. No.: 11/454,647

(22) Filed: Jun. 16, 2006

(65) Prior Publication Data

US 2007/0291414 A1 Dec. 20, 2007

(51) Int. Cl.
G11B 5/48 (2006.01)
(52) U.S. Cl. ................................... 360/244.9
(58) Field of Classification Search ............. 360/244.9, 360/244.2, 244.1, 244.3, 244.8
See application file for complete search history.

(56) References Cited

U.S. PATENT DOCUMENTS

| | | | |
|---|---|---|---|
| 5,408,372 A | 4/1995 | Karam, II | |
| 6,104,572 A * | 8/2000 | Williams et al. | 360/244.9 |
| 6,477,013 B1 * | 11/2002 | Kang et al. | 360/236.3 |
| 6,741,426 B2 * | 5/2004 | Girard | 360/245.4 |
| 6,900,966 B1 | 5/2005 | Xu | |
| 6,914,752 B2 | 7/2005 | Albrecht et al. | |
| 6,977,798 B2 | 12/2005 | Schulz et al. | |
| 7,469,464 B1 * | 12/2008 | Bjorstrom et al. | 29/603.06 |
| 2002/0131209 A1 * | 9/2002 | Anaya-Dufresne et al. | 360/236.2 |
| 2003/0116899 A1 * | 6/2003 | Girard | 267/160 |
| 2006/0028767 A1 | 2/2006 | Zhou et al. | |

* cited by examiner

*Primary Examiner*—Allen T Cao
(74) *Attorney, Agent, or Firm*—Saile Ackerman LLC; Stephen B. Ackerman (57) ABSTRACT

A loadbeam is locally stiffened by either, 1. the addition of strategically placed extra material to the loadbeam, 2. not removing material during the etching process to form the loadbeam, or 3. special forming, by crimping or bending, at specific sites on the beam. The use of local stiffening, when placed about the loadbeam dimple or between the dimple and flexure attachment points, with or without additional damping, can significantly improve the dynamical response of the loadbeam and eliminate vibrational modes of a slider mounted on the loadbeam during HDI interactions with disk surface asperities during disk drive operation.

33 Claims, 6 Drawing Sheets

SUSPENSION WITH LOCALLY STIFFENED LOAD BEAM

BACKGROUND OF THE INVENTION

1. Field of the Invention

This invention relates to the design of a suspension loadbeam to support slider mounted read/write transducers in disk drives. More particularly, it relates to a loadbeam design that provides superior dynamic performance during drive operation.

2. Description of the Related Art

A hard disk drive (HDD) uses an encapsulated thin film magnetic read/write head (transducer), called a slider, to read and write data on a magnetic medium or storage disk. The slider has a pre-patterned air-bearing surface (ABS) and is mounted on a flexible head gimbal assembly (HGA) that is itself mounted on a loadbeam. The combination of the loadbeam, the gimbal assembly (also referred to as a flexure), the electrically conducting leads (or traces), a hinge mechanism and a baseplate, is collectively termed the suspension. The suspension is activated by a servo actuator and associated electronic control circuitry to position the slider at various target locations along the magnetically encoded tracks on the disk. As the disk is rapidly rotated by a spindle motor, hydrodynamic pressure causes an air flow between the ABS of the slider and the surface of the disk. This flow, called the air-bearing layer, lifts and suspends the slider so that it literally flies above the surface of the disk (at a "fly height" of approximately 10 nm) on a layer of air called, appropriately, the air-bearing layer. The edge of the slider into which the disk rotates is called its "leading edge," the opposite edge, which contains the read/write head is called the "trailing edge." The loadbeam, as is known in the art, has a small protrusion or "dimple" formed on its disk-facing side that presses against the backside of the slider, providing a downward force and a pivot point for the slider to rotate about. This suspension system of loadbeam and flexure provides mechanical support for the slider while also allowing the slider pitch and roll capability when fly height is achieved. In addition, the system provides an electrical connection (i.e., a placement for the routing of conducting traces) between the read/write head and the pre-amplifier.

Enabling the slider to fly in a stable manner above the disk places stringent requirements on the suspension design, such as providing a proper range of its vertical stiffness (Kz), gimbal pitch and roll stiffness (Kp, Kr), gimbal pitch/roll static attitude (PSA/RSA), operational shock performance (G/gram) and the like. These requirements are mainly static and based on system geometry. A further requirement is that the suspension have little or no dynamic effect on the air bearing performance of the slider when the drive is operational. This requirement is related to the dynamic performance of the suspension. In general, dynamic performance requirements are not always enforced, so the dynamic performance of many existing suspensions is not good.

Figure 1:
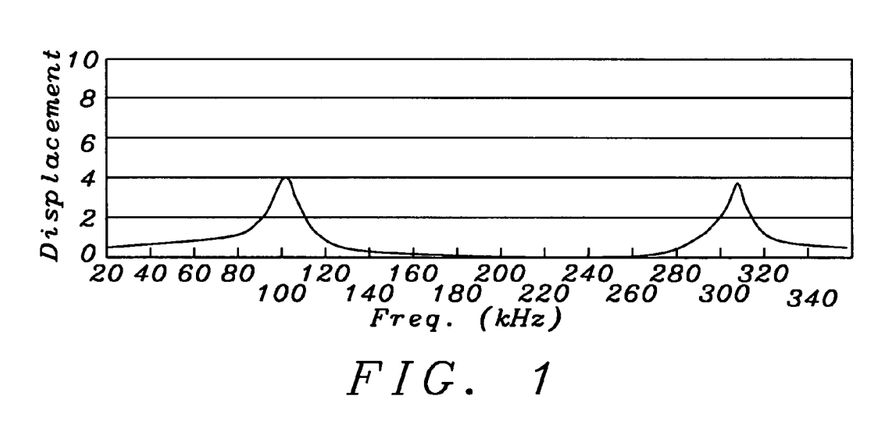
FIG. 1 is a schematic graphical representation of the vibrational response of a slider after it strikes a bump on a disk (an HDI interaction), there being no dynamical coupling between the slider, a gimbal and a loadbeam.

FIG. 1 shows the response of a slider striking a bump on a spinning disk under conditions that do not include dynamic effects of the suspension (i.e., the slider is not dynamically coupled to the suspension). The graph plots the vibrational response (air bearing modes) of the slider in a wide frequency range and shows that there are only two peaks in this response. The modes are strongly damped, producing a small vibrational amplitude and the slider settles down quickly.

Figure 2:
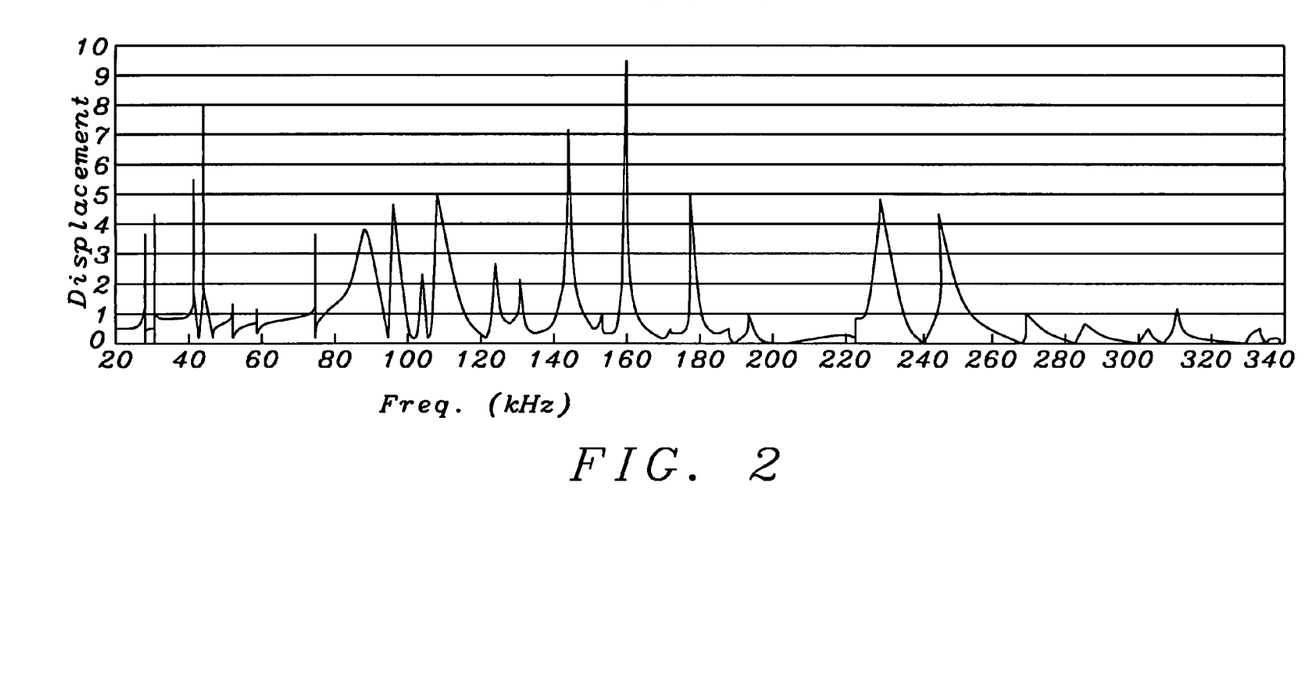
FIG. 2 is the schematic graphical representation of the vibrational response of a loadbeam mounted slider wherein there is full dynamic coupling between the slider, a gimbal and the loadbeam.

FIG. 2 shows a suspension mounted slider also striking a bump on a disk, but in a situation where the dynamic effects of the suspension now have a strong influence on the subsequent slider response because the slider and loadbeam suspension are dynamically coupled by the air-bearing layer. As can be seen, the response curve now displays many sharp peaks, which are the result of loadbeam/slider air bearing coupling modes. Those modes at low frequencies that are not well damped (the sharp peaks) make it difficult for the slider to relax to an equilibrium condition. They can even cause the air bearing condition to become unstable and generate a sustained vibration. Under such circumstances the disk drive will fail or, at the least, its performance will be seriously degraded.

Figure 3A:
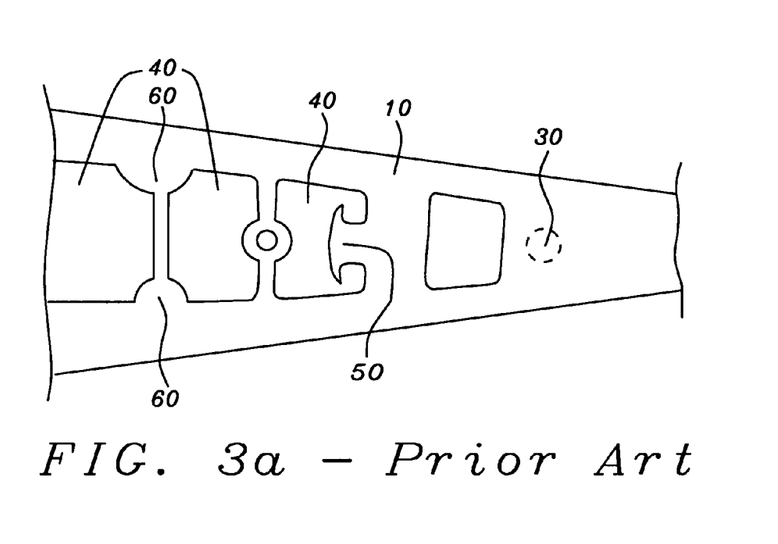
FIG. 3a is a schematic illustration of a portion of a thin and mass-reduced loadbeam design of the prior art.
Figure 3B:
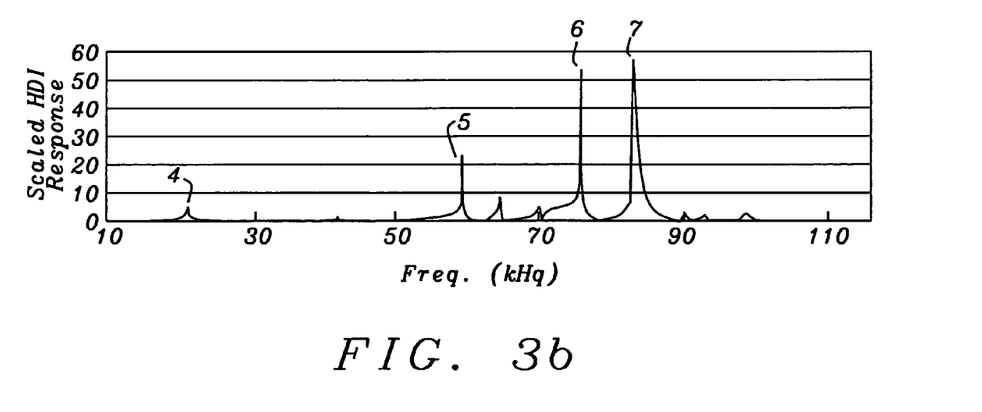
FIG. 3b is a graphical representation of slider vibrational modes induced in a slider mounted on the loadbeam of FIG. 3a subsequent to an HDI interaction.

Recent studies have shown that the design of the loadbeam can play an important role in slider dynamic response. This is especially true if a thin and mass-reduced loadbeam is used to achieve a high operational shock performance. FIG. 3b shows a slider response curve for a slider that is part of a suspension system that includes an existing loadbeam design (shown in FIG. 3a) that is thin (25 microns in thickness) and mass reduced through the use of strategically placed cut-outs. Except for the gimbal related peak at 57 kHz, the remaining three peaks are loadbeam related.

The prior art discloses several approaches to improving the performance of a suspension. Schulz et al. (U.S. Pat. No. 6,977,798) teaches the lamination of a specific composite material to the steel structure of load beam as a way of stiffening the load beam. The composite stiffeners are bonded to steel layers by an adhesive and cover most of the area of the loadbeam including the baseplate area. The loadbeam is then shaped after its composite layer and steel layer lamination has been formed. The purpose of the composite stiffeners is not to eliminate specific vibrational modes and resonances induced by HDI interactions, but rather to stiffen the entire suspension in response to aerodynamic forces.

Albrecht et al. (U.S. Pat. No. 6,914,752) teaches the use of a continuous contact slider, wherein the flexure must provide a moment to counteract the moment generated by the adhesive force between the disk and the slider's contact pad.

Xu (U.S. Pat. No. 6,900,966) teaches the stiffening of a load beam by means of welding together pieces of the load beam at weld pockets, rather than using spot welds.

Karam II (U.S. Pat. No. 5,408,372) teaches the stiffening of a load beam by the addition of material or by crimping the beam at locations on the beam near its flexible end. Karam is basically interested in eliminating very low frequency vibrations, between 1-10 kHz and does so by stiffening between the dimple and hinge of the suspension.

Zhou et al. (U.S. Patent Application 2006/0028767) teaches the formation of a stiffening rail by bending the load beam. The loadbeam of the invention uses no flexure, so all of the shocks to the suspension must be absorbed by the beam itself.

It is clear from a reading of the prior art cited above that there is a need to improve slider response to vibrational motion produced by head-disk interface (HDI) interaction of a loadbeam mounted slider with disk asperities (i.e., bumps and other deviations from disk planarity) while the disk is in rotational motion.

SUMMARY OF THE INVENTION

The first object of the present invention is to provide a loadbeam support system for a slider mounted read/write transducer that is optimized for dynamic response to HDI events.

The second object of the present invention is to provide such a dynamically optimized loadbeam that does not degrade already acceptable static slider properties such as stiffness in response to pitch, roll and radial motion.

The third object of the present invention is to provide a loadbeam support system wherein the improved response of the operational slider is verified by the reduction of a certain range of vibrational mode peaks, indicating elimination of and/or superior damping of the vibrational modes of interest.

The fourth object of the present invention is to provide such a dynamically optimized loadbeam design wherein the optimization requires minimal changes in the loadbeam fabrication process.

The objects of this invention are achieved by a loadbeam design in which the improved dynamical performance of the system is obtained by local stiffening of a design structure that, in other respects, such as its static properties, provides acceptable performance parameters. This local stiffening, in the context of the present invention, is a stiffening of a small portion of the loadbeam, such stiffening being produced by either the strategic addition of extra material to a pre-existing (e.g. a reduced mass) design that, while acceptable in its static properties, lacks the requisite dynamic performance characteristics or, alternatively, the local stiffening can be attained when etching away material from a loadbeam during its fabrication, by leaving additional, strategically placed stiffening material. The placement of the stiffening material can be combined with the placement of damping material to further reduce vibrational mode peaks.

Finally, stiffening can also be accomplished by a forming process, in which the body of the loadbeam is locally shaped, by a method such as crimping, so as to provide additional stiffness to a strategically located region, for example, in the region surrounding the dimple that protrudes from the loadbeam and provides a downward pressure on the slider. It is found that by specially forming the region between the loadbeam dimple and the points at which the flexure is welded to the loadbeam, the desired dynamic response of the loadbeam will be obtained.

Figure 4A:
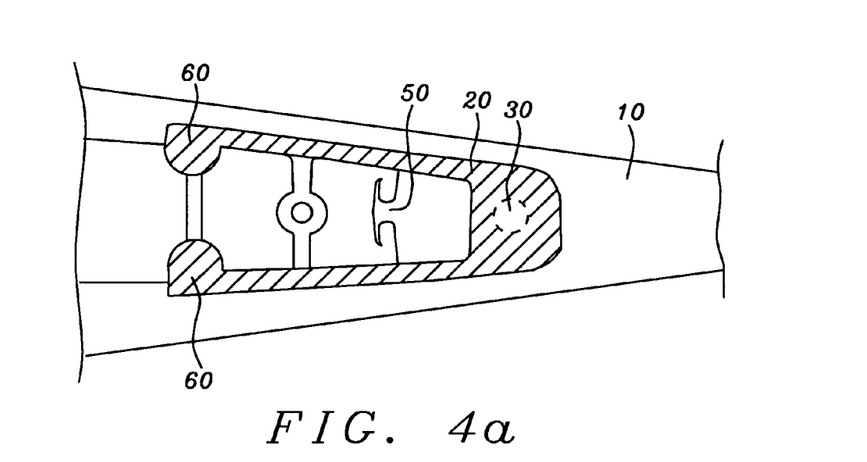
FIG. 4a shows a schematic illustration of a locally stiffened loadbeam design produced by the additional of stiffening material.
Figure 4B:
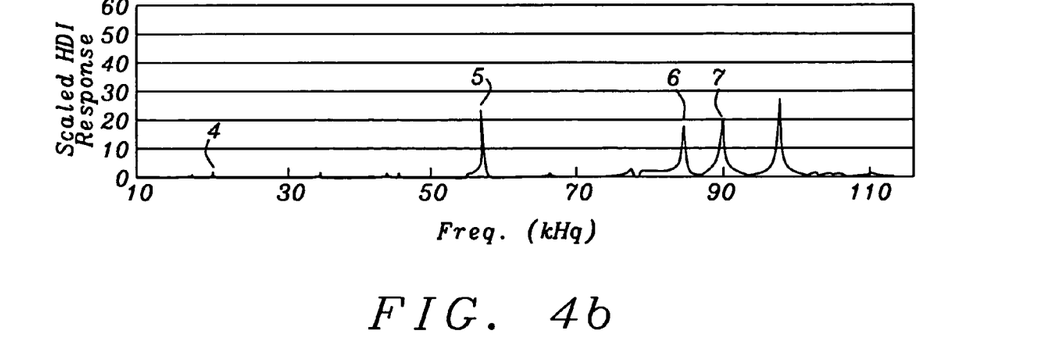
FIG. 4b is a schematic graphical representation of slider vibrational modes induced in a slider mounted on the loadbeam of FIG. 4a subsequent to an HDI interaction.

FIG. 4a shows, schematically, an overhead view of a locally stiffened loadbeam wherein the stiffening is supplied by the addition of a piece of shaped material (20) that is fastened to the otherwise improperly dynamically responsive loadbeam (10). FIG. 4b is a schematic graphical illustration of the vibrational response of a slider mounted on the loadbeam of FIG. 4a. A comparison of the graph of FIG. 4b, with an analogous graph in FIG. 3b, which would correspond to the performance of the unstiffened loadbeam, clearly indicates the reduction of vibrational mode peaks. The remaining figures will be discussed in the context of the description of the invention.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein.

DESCRIPTION OF THE PREFERRED EMBODIMENTS

Each preferred embodiment of the present invention is a locally stiffened loadbeam, with or without the addition of damping material, providing superior dynamic performance. This performance can be measured by the vibrational response of a gimbal mounted slider subsequent to an HDI interaction between the slider and a bump or other asperity on a rapidly rotating disk.

The object of each embodiment of the present invention is to improve slider response to vibrational motion produced by head-disk interface (HDI) interaction between a loadbeam mounted slider and a disk with surface asperities (i.e., bumps and other deviations from disk planarity) while the disk is in rotational motion. This improvement of slider response and, thereby, of slider performance is achieved by means of a loadbeam design that stiffens the loadbeam locally.

Local stiffening, in the context of the present invention, is a process of stiffening relatively small portions of the loadbeam, i.e., making the structure of the loadbeam more resistant to flexing at strategic positions by either: 1. fastening minimal amounts of additional material to an already formed loadbeam structure, or 2. allowing extra material to remain on the loadbeam while it is being fabricated using an etching process, or 3. forming (e.g. crimping or bending) small regions of the loadbeam. The purpose of the local stiffening, by whichever of the methods it is accomplished, is to optimally reduce certain slider/loadbeam vibrational resonances triggered by interaction between the disk and the slider during disk operation, the so-called "head-disk interface" or "HDI"

interaction. The vibrational modes induced by such HDI interactions are in the frequency range above 10 kHz and the strategic locations that best produce the localized loadbeam stiffness and/or the damping of these specific modes so as to achieve the objects of the present invention are around the location of the loadbeam dimple and between the dimple and the laser welding points at which the flexure is fastened. It is to be noted that the placement of the stiffening material specifically addresses the vibrational modes induced by the interaction between the slider and disk asperities (e.g. bumps and other deviations from absolute planarity of the disk). Unlike the prior arts cited above, the embodiments of the present invention do not address aerodynamic lift forces, flexure moments or the stability of loadbeams that do not incorporate flexures. It is also to be noted that the addition of locally stiffening material to the loadbeam, or the special forming or regions of the loadbeam, can be augmented by the addition of damping materials to the loadbeam.

First, by comparing FIG. 1 to FIG. 2 there is clearly seen the effects of loadbeam coupling to a slider during HDI interactions. In FIG. 1, which plots the vibrational displacement of slider that is not mounted on a suspension as a function of vibrational frequency, it is seen that the slider displays only two low and broad vibrational peaks at about 100 kHz and 300 kHz. These peaks represent the air-bearing layer vibrational modes themselves and they are strongly damped by the hydrodynamic properties of that layer. FIG. 2 displays a comparable graph for a slider that is mounted to a prior art loadbeam suspension of ordinary quality. There is now seen a multiplicity of high, sharp peaks indicating low damping of vibrational modes at many frequencies. These modes represent slider vibrations induced by the dynamic coupling between the air-bearing layer and the suspension. The comparison between FIG. 1 and FIG. 2 illustrates the adverse effects of mounting a slider on a suspension.

FIG. 3b shows the graphical results of HDI interaction vibrations when the slider is mounted on a high quality prior art loadbeam of thin (25 microns thickness) and reduced mass design. A loadbeam of this type, (see FIG. 3a), even without the stiffening of the present invention, plays an important role in achieving good static properties and high quality operational shock performance. A distal portion of the loadbeam (10) is illustrated in FIG. 3a, showing, schematically, the cut-outs (40) that reduce loadbeam mass and the regions (60) at which the flexure (not shown) will be fastened to the loadbeam by welds. The dimple (30) is shown as a dashed circle, but it extends beneath the plane of the figure. A downward projecting member (50) serves to help support the flexure, which is not shown in this figure.

Referring back to FIG. 3b, it can be seen from the graph that vibrational modes still appear, but the results are much better than in FIG. 2. Except for the peak at approximately 57 kHz (5), which is gimbal related, all other peaks are a result of dynamic coupling to the loadbeam. In particular, the peak at 20 kHz (4), even though it appears small in magnitude, has a significant adverse effect on slider behavior because of its frequency. The peaks at 75 kHz (6) and 85 kHz (7) will have an adverse effect because of their height.

Referring next to FIG. 4a, there is seen a locally stiffened loadbeam design of the present invention as applied to the unstiffened loadbeam of FIG. 3a, but which could be applied to loadbeams of similar design and structure. The stiffening member (20) (drawn shaded) is placed between the dimple (30), which is now beneath the stiffening member but still shown as a dashed circle and the region at which the flexure is affixed to the loadbeam (60), beneath the loadbeam. The affixing of the flexure is in the form of welds in this embodiment, but other means of fastening the flexure to the loadbeam can be used and the stiffening member would still be positioned between the dimple and the points of the fastening. In this embodiment, the stiffening member is attached to the loadbeam (10) by welding or glue. The stiffening member is preferably stainless steel, which is typically the same material as the loadbeam. If the stiffening member is formed of the loadbeam material, it can be formed to have a lighter mass (for example, by the use of cut-outs or thinner material) and a higher stiffness (for example, by bending its edges or otherwise forming the member). Alternatively, the stiffening member may be formed of lighter material, such as aluminum. If the member is not formed of the same material as the loadbeam, the stiffening member should-be thermally matched to the loadbeam to avoid the disadvantageous effects of differential thermal expansion. If it is desired to add damping material to the loadbeam, a layer of vibrationally absorptive material may be added between the loadbeam (10) and the stiffening member (20). Such a layer is not shown here. It is noted that if the stiffening member is attached with adhesive, such as epoxy, the adhesive itself may serve as a damping material.

Referring now to FIG. 4b, and comparing the graph to that of FIG. 3b, there is seen both a reduction in peak height of the loadbeam/slider coupling modes as well as a shift of certain of the modes to higher frequencies. Shifting to higher frequencies is advantageous as these frequencies will have less of an adverse effect on slider behavior. In particular, the peak at 20 kHz (4) is greatly reduced compared to the same peak in FIG. 3b. The 57 kHz peak that is gimbal related is, of course, not affected. The peaks at 75 kHz and 85 kHz, shown as (6) and (7) in FIG. 3b, have been reduced in height and shifted to approximately 85 kHz and 90 kHz (6) and (7) in FIG. 4b. Higher frequency peaks than (7) will not have a significant adverse effect.

Figure 5A:
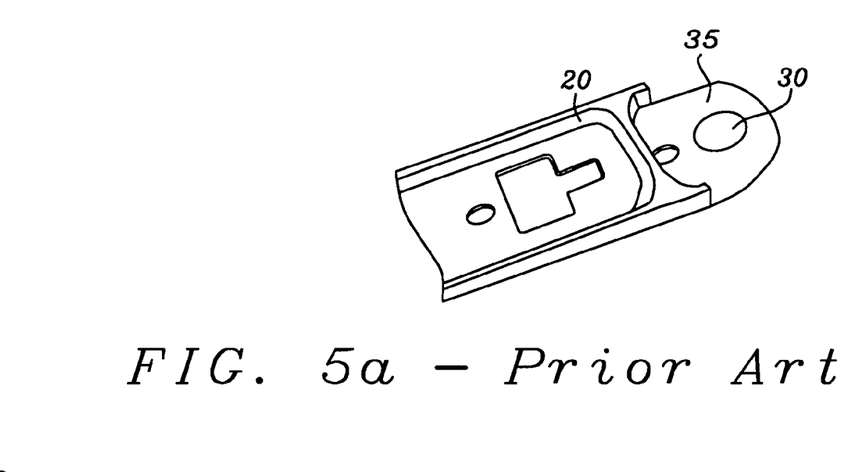
FIG. 5a is a schematic illustration of an etched prior art loadbeam design without stiffening around the dimple.
Figure 5B:
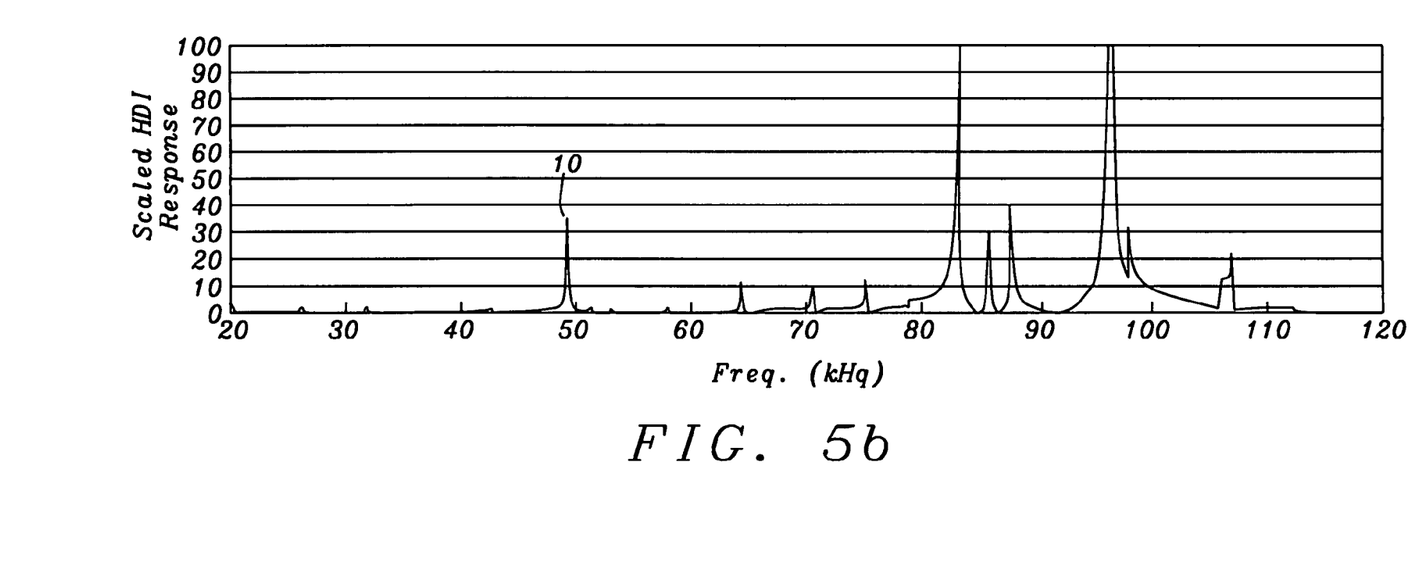
FIG. 5b is a schematic graphical illustration of the slider vibrational modes induced in a slider mounted on the loadbeam of FIG. 5a subsequent to an HDI interaction.

Referring next to FIG. 5a, there is shown a sketch of a distal portion of a prior art loadbeam design that is produced by an etch process. The etch leaves a pair of parallel, lateral rails (20) that do not extend as far as the dimple (30) (shown schematically as a circle, but it extends downward. Therefore, the region immediately around the dimple (35) lacks stiffness and is relatively weak. FIG. 5b is a graphical representation of the vibrational response of a slider mounted on the loadbeam of FIG. 5a after a HDI interaction has occurred. It can be seen that there is a sharp peak around 49 kHz (10), which is related to the weakness around the dimple.

Figure 6A:
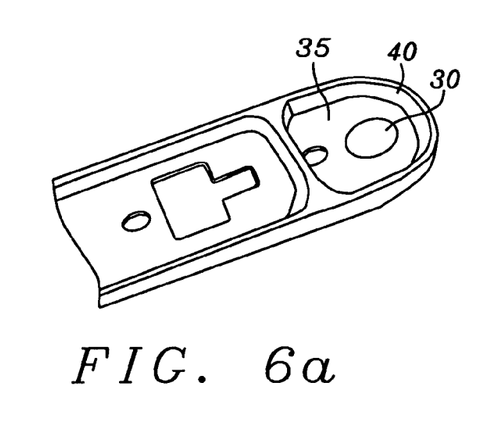
FIG. 6a is a schematic illustration of an etched loadbeam design similar to that in FIG. 5a, but there is a local stiffening rim, produced by the etch, formed completely around the dimple.

Referring now to FIG. 6a, there is shown, schematically, a distal portion of an etched loadbeam design that differs from that in FIG. 5a only by the fact that the etching process has allowed additional material to remain, forming a continuous rail (40) or rim surrounding the loadbeam dimple (30) and peripheral to the region surrounding the dimple (35). The surrounding rail (40) stiffens the dimple region (35) significantly as compared to the unstiffened loadbeam of FIG. 5a.

Figure 6B:
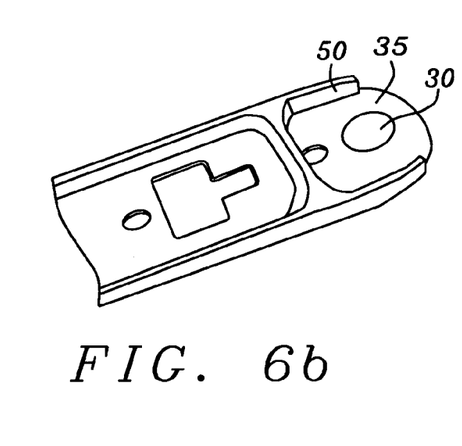
FIG. 6b is a schematic illustration of an etched loadbeam design similar to that in FIG. 6a, but there is a local stiffening rim, produced by the etch, formed partially around the dimple.

Referring to FIG. 6b, there is shown, schematically, a distal portion of a loadbeam design that differs from that illustrated in FIG. 6a by the fact that the additional railing material (50) left by the etch only partially surrounds the dimple (30) and the region (35) immediately around it, but still stiffens it. It is to be noted that the rail shape illustrated in FIGS. 6a and 6b are appropriate shapes to stiffen the loadbeam design of FIG. 5a, but other etched designs can be envisioned in which the use of unetched material to stiffen the loadbeam might not be in the form of railings or rims but in the form of other thickened reinforcing members.

Figure 6C:
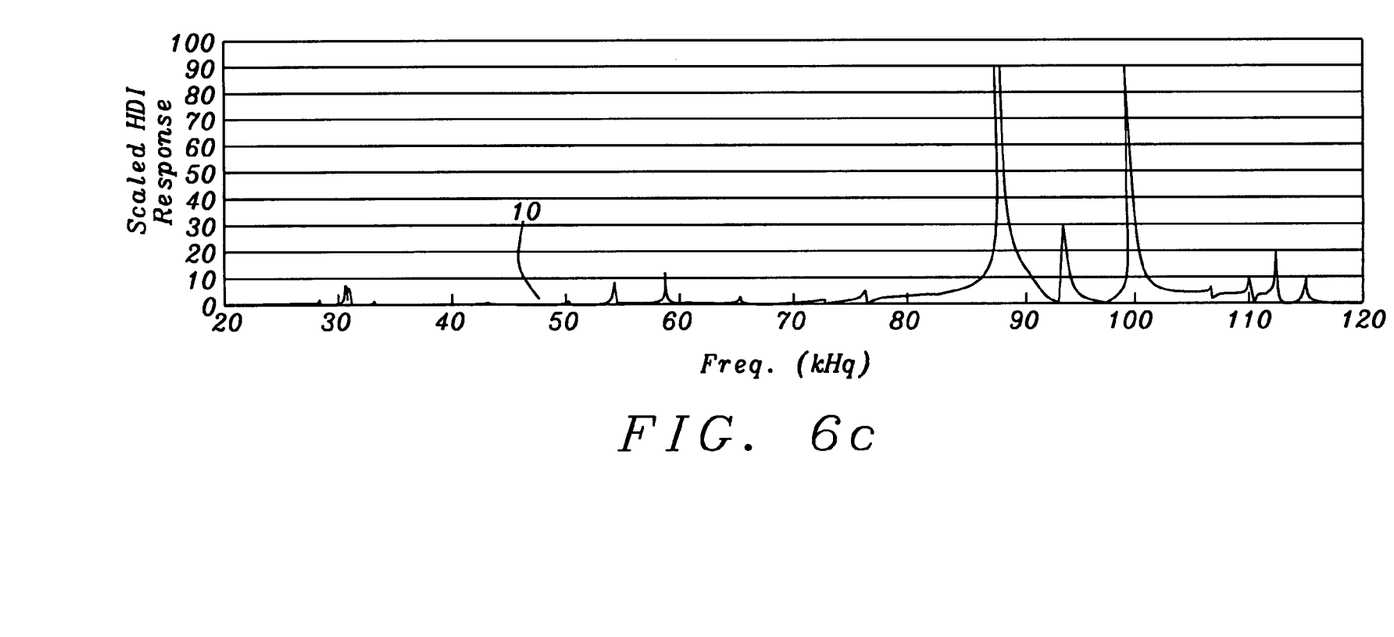
FIG. 6c is a schematic graphical illustration of the vibrational modes induced in a slider mounted on the loadbeam of FIG. 6b subsequent to an HDI interaction.

Referring to FIG. 6c, there is shown the slider vibrational response to an HDI interaction for the loadbeam design of FIG. 6*b*. Comparing this response to that shown in FIG. 5*b*, there can be seen the damping of several vibrational modes as a result of the stiffening. In particular, a peak at 49 kHz (10) has been eliminated compared to FIG. 5*b*, indicating that the stiffening of the region surrounding the dimple has been effective in damping that vibrational mode. Higher frequency modes, which are not as adverse for slider behavior as those of lower frequency, are both shifted upward and changed in shape.

Figures 7A, 7B:
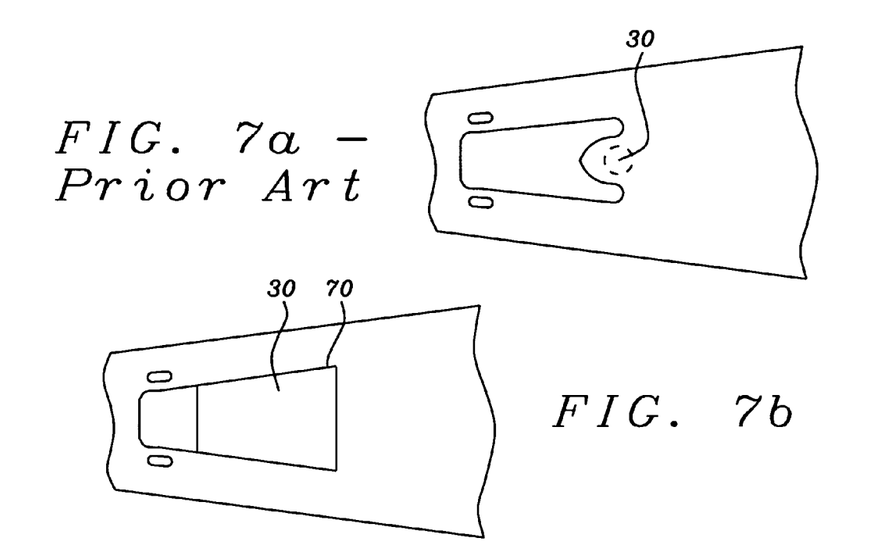
FIG. 7a is a schematic illustration of a prior art loadbeam design showing the position of the dimple.
FIG. 7b is a schematic illustration of die loadbeam design of FIG. 7a wherein the local stiffening has been achieved by the addition of material around and over the dimple.

Referring now to FIG. 7*a* and FIG. 7*b*, there are shown, respectively, a schematic illustration of a distal portion of an unstiffened prior art loadbeam (FIG. 7*a*), showing its dimple (30), and the same portion of an identical loadbeam (FIG. 7*b*), now stiffened by the addition of material (70) (shown shaded) that covers the dimple (30) (not seen) and extends slightly beyond it. The additional material is, typically, the same material as that forming the loadbeam and it can be attached to the loadbeam by welding or the use of adhesives.

Figures 8A, 8B:
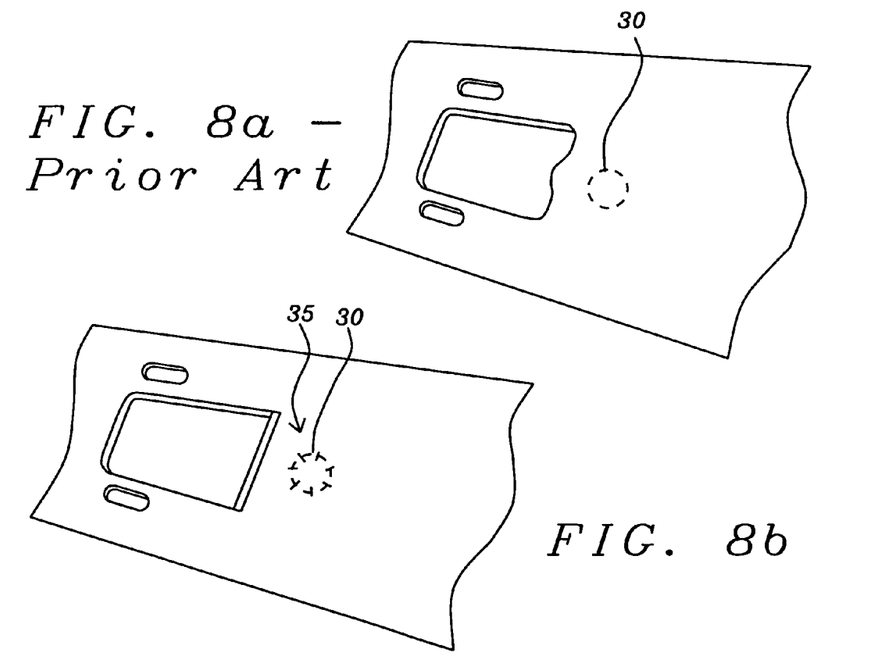
FIG. 8a is a schematic illustration of a prior art loadbeam design showing the position of the dimple.
FIG. 8b is a schematic illustration of the loadbeam design of FIG. 8a wherein the local stiffening has been achieved by forming (crimping) around the dimple.

Referring finally to FIG. 8*a* and FIG. 8*b*, there are shown, respectively, a schematic, perspective illustration of a distal portion of an unstiffened loadbeam (FIG. 8*a*), substantially identical to that shown if FIG. 7*a*, where the dimple (30) is shown as a dashed circle. In FIG. 8*b*, the same loadbeam of FIG. 8*a* is shown, but the material region (35) surrounding and closely adjacent to the dimple (30) has now been stiffened by forming, i.e., by crimping that surrounding material. The crimping is illustrated schematically by radiating lines. It is well known in the field that such special forming processes will generally produce plastic deformations of the loadbeam material structure that provides the stiffening that is required.

As is understood by a person skilled in the art, the preferred embodiments of the present invention are illustrative of the present invention rather than being limiting of the present invention. Revisions and modifications may be made to methods, processes, materials, structures, and dimensions through which is formed a locally stiffened loadbeam providing damping of HDI induced coupled loadbeam/slider vibrational modes in a slider mounted thereon, while still providing such a loadbeam mounted slider, formed in accord with the present invention as defined by the appended claims.

What is claimed is:

1. A HDD suspension, comprising:
    a loadbeam having an upper surface and a lower surface, said lower surface having a distally located region of affixation to which is affixed a gimbal mounted slider and said loadbeam further including a dimple projecting downward from said lower surface, said dimple being distal to said region of affixation; and
    said loadbeam having a locally stiffened region formed by the attachment of a stiffening member to said upper surface of said loadbeam at a position between said dimple and said region of gimbal affixation; whereby, subsequent to an HDI interaction between said slider and a disk rotating beneath said slider, whereby
    there is a reduction in the adverse effects of slider vibrational modes produced by dynamic coupling between said slider and said loadbeam.

2. The HDD suspension of claim 1 wherein said stiffening member is formed of the same material as the loadbeam.

3. The HDD suspension of claim 1 wherein said stiffening member is attached by welding.

4. The HDD suspension of claim 1 wherein said stiffening member has a layer of damping material attached thereto.

5. The HDD suspension of claim 1 wherein said vibrational modes are reduced in amplitude by said local stiffening.

6. The HDD suspension of claim 1 wherein said vibrational modes are shifted upward in frequency by said local stiffening.

7. The HDD suspension of claim 1 wherein said vibrational modes are changed in shape by said local stiffening.

8. The HDD suspension of claim 1 wherein said vibrational modes are above 10 kHz in frequency.

9. A HDD suspension, comprising:
    a loadbeam having an upper surface and a lower surface, said lower surface having a distally located region to which is affixed a gimbal mounted slider and said loadbeam further including a dimple projecting downward from said lower surface, said dimple being distal to said region of affixation; and
    said loadbeam having a locally stiffened region created by a process of special forming of a region surrounding said dimple; whereby, subsequent to an HDI interaction between said slider and a disk rotating beneath said slider, whereby
    there is a reduction in the adverse effects of slider vibrational modes produced by dynamic coupling between said slider and said loadbeam.

10. The HDD suspension of claim 9 wherein said special forming comprises a crimping of the loadbeam material in said region surrounding the dimple.

11. The HDD suspension of claim 9 wherein said vibrational modes are reduced in amplitude by said local stiffening.

12. The HDD suspension of claim 9 wherein said vibrational modes are shifted upward in frequency by said local stiffening.

13. The HDD suspension of claim 9 wherein said vibrational modes are changed in shape by said local stiffening.

14. The HDD suspension of claim 9 wherein said vibrational modes are above 10 kHz in frequency.

15. A HDD suspension, comprising:
    a loadbeam having an upper surface and a lower surface, said lower surface having a distally located region to which is affixed a gimbal mounted slider and said loadbeam further including a dimple projecting downward from said lower surface, said dimple being distal to said region of affixation; and
    said loadbeam having a locally stiffened region formed by fastening a stiffening member to said upper surface over said dimple; whereby, subsequent to an HDI interaction between said slider and a disk rotating beneath said slider, whereby
    there is a reduction in the adverse effects of slider vibrational modes produced by dynamic coupling between said slider and said loadbeam.

16. The HDD suspension of claim 15 wherein said stiffening member is formed of the same material as the loadbeam.

17. The HDD suspension of claim 15 wherein said stiffening member is attached by welding.

18. The HDD suspension of claim 15 wherein said stiffening member has a layer of damping material attached thereto.

19. The HDD suspension of claim 15 wherein said vibrational modes are reduced in amplitude by said local stiffening.

20. The HDD suspension of claim 15 wherein said vibrational modes are shifted upward in frequency by said local stiffening.

21. The HDD suspension of claim 15 wherein said vibrational modes are changed in shape by said local stiffening.

22. The HDD suspension of claim 15 wherein said vibrational modes are above 10 kHz in frequency.

23. A HDD suspension, comprising:
a loadbeam having an upper surface and a lower surface, said lower surface having a distally located region to which is affixed a gimbal mounted slider and said loadbeam further including a dimple extending downward from a distal portion of said region of said lower surface; and said loadbeam having a locally stiffened region formed on said upper surface as a rim or rail surrounding or partially surrounding said dimple and peripheral to said dimple, said rim or rail being formed from material remaining from an etching process wherein said loadbeam is fabricated; whereby, subsequent to an HDI interaction between said slider and a disk rotating beneath said slider, whereby there is a reduction in the adverse effects of slider vibrational modes produced by dynamic coupling between said slider and said loadbeam.

24. The HDD suspension of claim 23 wherein said vibrational modes are reduced in amplitude by said local stiffening.

25. The HDD suspension of claim 23 wherein said vibrational modes are shifted upward in frequency by said local stiffening.

26. The HDD suspension of claim 23 wherein said vibrational modes are changed in shape by said local stiffening.

27. The HDD suspension of claim 23 wherein said vibrational modes are above 10 kHz in frequency.

28. A method of forming HDD suspension, comprising:
providing a loadbeam having an upper surface and a lower surface, said lower surface having a distally located region of affixation to which is affixed a gimbal mounted slider and said loadbeam further including a dimple projecting downward from said lower surface, said dimple being distal to said region of affixation; and locally stiffening a region of said loadbeam by the attachment of a stiffening member to said upper surface of said loadbeam at a position over said dimple or between said dimple and said region of gimbal affixation; whereby, subsequent to an HDI interaction between said slider and a disk rotating beneath said slider, whereby there is a reduction in the adverse effects of slider vibrational modes produced by dynamic coupling between said slider and said loadbeam.

29. The method of claim 28 wherein said stiffening member is formed of the same material as the loadbeam and is attached by welding.

30. The method of claim 28 wherein said stiffening member has a layer of damping material attached thereto.

31. A method of forming a HDD suspension, comprising:
providing a loadbeam having an upper surface and a lower surface, said lower surface having a distally located region to which is affixed a gimbal mounted slider and said loadbeam further including a dimple projecting downward from said lower surface, said dimple being distal to said region of affixation; and forming a locally stiffened region on said loadbeam by a process of special forming of a region surrounding said dimple; whereby, subsequent to an HDI interaction between said slider and a disk rotating beneath said slider, whereby there is a reduction in the adverse effects of slider vibrational modes produced by dynamic coupling between said slider and said loadbeam.

32. The method of claim 31 wherein said special forming comprises a crimping of the loadbeam material in said region surrounding the dimple.

33. A method of forming a HDD suspension, comprising:
fabricating, by an etching process, a loadbeam having an upper surface and a lower surface, said lower surface having a distally located region to which is affixed a gimbal mounted slider and said loadbeam further including a dimple extending downward from a distal portion of said region of said lower surface; and forming a locally stiffened region of said loadbeam by allowing to remain on said upper surface a rim or rail shaped structure completely surrounding said dimple or partially surrounding said dimple and peripheral to said dimple, said rim shaped structure being formed of material not removed by said etching process; whereby, subsequent to an HDI interaction between said slider and a disk rotating beneath said slider, whereby there is a reduction in the adverse effects of slider vibrational modes produced by dynamic coupling between said slider and said loadbeam.

* * * * *